(12) United States Patent
Dente

(10) Patent No.: US 6,277,396 B1
(45) Date of Patent: Aug. 21, 2001

(54) DIETARY SUPPLEMENT CONTAINING A THERMOGENIC SUBSTANCE AND AN ADRENAL SUPPORT SUBSTANCE

(75) Inventor: Gerard Dente, Cedar Grove, NJ (US)

(73) Assignee: Maximum Human Performance, Inc., Cedar Grove, NJ (US)

( * ) Notice: Subject to any disclaimer, the term of this patent is extended or adjusted under 35 U.S.C. 154(b) by 0 days.

(21) Appl. No.: 09/568,587

(22) Filed: May 11, 2000

(51) Int. Cl.[7] .................. A61K 47/00; A61K 9/14; A61K 9/48; A61K 47/32
(52) U.S. Cl. .......... 424/439; 424/434; 424/436; 424/489; 424/451; 424/725; 424/728; 514/966; 514/772.4
(58) Field of Search .................. 424/436, 439, 424/725

(56) References Cited

U.S. PATENT DOCUMENTS

| 5,436,230 | * | 7/1995 | Soudant et al. | 514/21 |
| 5,443,838 | * | 8/1995 | Koenig, Jr. | 424/439 |
| 5,571,441 | * | 11/1996 | Andon et al. | 252/1 |

* cited by examiner

Primary Examiner—Thurman K. Page
Assistant Examiner—Rachel M. Bennett
(74) Attorney, Agent, or Firm—Dan M. de la Rosa

(57) ABSTRACT

A dietary supplement system having a daytime component and a nighttime component is provided, wherein the daytime component comprises at least one thermogenic substance and the nighttime component comprises at least one adrenal support substance.

6 Claims, No Drawings

DIETARY SUPPLEMENT CONTAINING A THERMOGENIC SUBSTANCE AND AN ADRENAL SUPPORT SUBSTANCE

FIELD OF THE INVENTION

The present invention relates to a dietary supplement comprising at least one thermogenic substance, at least one adrenal support substance and/or at least one anxiolytic substance. More particularly, the presently claimed invention relates to a dietary supplement system having daytime and nighttime conmponents wherein the daytime component contains a thermogenic substance and the nighttime component contains an adrenal support substance.

BACKGROUND OF THE INVENTION

Dietary and nutritional supplements have become a significant element of the human diet. Most dietary supplements contain stimulants as their active ingredient. Generally, stimulants can have undesirable side effects. The most common side effect is a general "jittery" feeling, but other side effects include stress on adrenal glands, restlessness, nervousness, gastro intestinal disturbances, muscle twitching, and in some extreme cases, cardiac arrhythmia. In view of the above, dietary supplements containing stimulants are not designed for nighttime usage. Because of the stimulants, dietary supplements are formulated for daytime consumption and not recommended for nighttime usage. The present invention provides a 24-hour dietary supplement system that can be consumed for daytime and nighttime usage.

SUMMARY OF THE INVENTION

The present invention provides a dietary supplement comprising at least one thermogenic substance and at least one adrenal support substance. In one embodiment, the thermogenic substance is selected from a group consisting of caffeine, catechin, MaHuang, ephedrine, synephrine (*Citrus aurantium*), norephedrine, psuedoephedrine, and White Willow (*salicin*) and extracts thereof and mixtures thereof. For purposes of this invention, the term "thermogenic" is defined as any natural or synthetic substance, nutrient, vitamin, mineral, herb or compound used to increase metabolism and accelerate calorie expenditures. In one embodiment, the term thermogenic means heat producing or fat burning. In another embodiment, the adrenal support substance is selected from a group consisting of Cordyceps (*Cordyceps sinensis*), Ashwagandha (*Withania somniferum*), Astragalus (*Asgragalus mebranaceus*), ginseng (*Panax ginseng*), Schisandra (*Schizendra chinensis*), Siberian ginseng (*Eleutherococcus senticosus*), licorice (*Glycerrhiza glabra*), Asian ginseng, Codonopsis ("Dangshen"), Vitamin B complex, Vitamin C, adrenal glandular extract, embryo extract, chromium, Vitamin B5 (pantothenic acid) and extracts thereof and mixtures thereof. The term "adrenal support" substance is defined as any natural or synthetic substance, nutrient, vitamin, mineral, herb, or compound used to support, maintain and/or improve adrenal functions and to reduce stress.

In still another embodiment, the supplement further comprises at least one thyrogenic substance. In yet another embodiment, the thyrogenic substance is selected from a group consisting of Guggul (*Commiphora mukul*) or guggulsterones, iodine, copper, selenium, thyroid glandular extract, tyrosine, phosphates and extracts thereof and mixtures thereof. In one embodiment, the iodine sources include, but are not limited to, seaweed, kelp, seafood, shellfish, and bladderwrack (*Focus vesiculosus*). For purposes of this invention, a "thyrogenic" substance is any natural or synthetic substance, nutrient, vitamin, mineral, herb or compound used to support, maintain, and/or improve thyroid functions.

In still yet another embodiment, the supplement further comprises at least one blood sugar regulation substance. In a further embodiment, the blood sugar regulation substance is selected from a group consisting of Bitter Melon (*Momordica charantia*), vanadium, allano lactone, Fenugreek (*Trigonella foenumgraecum*), garcinia (*Garcinia cambogia*), gymnema (*Gymnema sylvestra*), marshmallow (*Althaea officinalis*), chromium, chromium GTF, chromium picolinate, chromium polynicotinate, alpha lipoic acid, inula racemusa, zinc, magnesium, cyclo-hispor, Agaricus campestris (mushroom), *Medicago sativa* (Lucerna), pinitol (*Bougainvillea spectabilis*) and extracts thereof and mixtures thereof. A "blood sugar regulation" substance is defined as any natural or synthetic substance, nutrient, vitamin, mineral, herb, or compound used to regulate or manipulate blood sugar levels and/or glucose metabolism. The current US diet consist of high amounts of carbohydrates and refined sugars. This can result in elevated blood sugar levels. High levels of blood sugar can increase the production of insulin, which accelerates the storage of body fat. The blood sugar regulation substance of the present invention, functions to help stabilize normal blood sugar levels and increase the body's ability to lose stored body fat.

In still a further embodiment, the supplement further comprises at least one anxiolytic substance. An "anxiolytic" substance is defined as any natural or synthetic substance, nutrient, vitamin, mineral, herb or compound used as a calming agent, to reduce stress and anxiety, or improve sleep. In yet a further embodiment, the anxiolytic substance is selected from a group consisting of valerian (*Valeriana officinalis*), damiana, chamomile (*Matricaria chamomila*), kava kava (*Piper methysticum*), passionflower (Passilflora spp.), hops (*Humulus lupulus*), skullcap, St. John's wort (*Hypericum perforatum*), hawthorn (*Crataegus oxyacantha*), lavender (*Lavendula officinalis*), melatonin, 5-Hydroxytrytophan and extracts thereof and mixtures thereof.

In one embodiment, the supplement further comprises at least one diuretic or water balancing substance. Normal diets contain high amounts of sodium, which can lead to excessive amounts of water retention. The water balancing substance of the present invention will help regulate and relieve excessive water retention. In another embodiment, the water balancing substance is selected from a group consisting of cranberry (*Vaccinum magrocapon*), dandelion, elder (*Sambucus nigra*, Sambucus Canadensis), horsetail (*Equisetum arvense*), uva ursi (*Arctostaphylos uva-ursi*), parsley (*Petroselinum crispum*), B-6 and extracts thereof and mixtures thereof.

In still yet a further embodiment, the present invention relates to dietary supplement system comprising a daytime component and a nighttime component, said daytime component comprising at least one thermogenic substance and said nighttime component comprising at least one adrenal support substance. In another embodiment, the system is a 24-hour system. In still another embodiment, the thermogenic substance is selected from a group consisting of caffeine, catechins (epigalocatechin-EGCG), MaHuang (8% Ephedra alkaloids) ephedrine HCI, synephrine, norephedrine, psuedoephedrine, and White Willow and extracts thereof and mixtures thereof. In one embodiment, the caffeine may be green tea (*Camilla sinensis*) and guarana (methylxanthines). In yet another embodiment, the adrenal support substance is selected from a group consisting of Cordyceps, Ashwagandha, Astragalus, ginseng, Schisandra, Siberian ginseng, licorice, Asian ginseng, Codonopsis, Vitamin B complex, pantothenic acid, Vitamin C, adrenal glandular extract, chromium and extracts thereof and mixtures thereof.

In still yet another embodiment, the daytime component further comprises at least one thyrogenic substance; the thyrogenic substance is selected from a group consisting of Guggul (guggulsterones), iodine, copper, selenium, thyroid glandular extract, tyrosine, phosphates and extracts thereof and mixtures thereof In a further embodiment, the daytime component further comprises at least one blood sugar support substance; the blood sugar support substance being selected from a group consisting of Bitter Melon, vanadium, allano lactone, Fenugreek, garcinia, gymnema, marshmallow, chromium, chromium GTF, chromium picolinate, chromium polynicotinate, alpha lipoic acid, inula racemusa, zinc, magnesium, cyclo-hispor, *Agaricus campestris, Medicago sativa*, pinitol and extracts thereof and mixtures thereof.

In still a further embodiment, the nighttime component further comprises at least one anxiolytic substance; the anxiolytic substance is selected from a group consisting of valerian, damiana, chamomile, kava kava, passionflower, hops, skullcap, St. John's wort, hawthorn, lavender, melatonin, 5-Hydroxytrytophan and extracts thereof and mixtures thereof In still yet a further embodiment, nighttime component further comprises at least one thyrogenic substance; the thyrogenic substance being selected from a group consisting of Guggul (guggulsterones), iodine, copper, selenium, thyroid glandular extract, tyrosine and extracts thereof and mixtures thereof. In a further embodiment, the nighttime component of the system of the present invention further comprises at least one water balancing substance; the water balancing substance being selected from a group consisting of cranberry, dandelion, elder, urva ursi, parsley, B-6 and extracts thereof and mixtures thereof In yet another embodiment, the supplement comprises a water balance blend. In still another embodiment, the water balancing blend comprises the water balancing substance and other ingredients. In still yet another embodiment, the water balance blend comprises Buchu leaf, cornsilk stylus, couchgrass rhizome, hydrangea root, juniper berry, uva ursi leaf, cranberry fruit, dandelion root, artichoke leaf, and extracts thereof and mixtures thereof. In a further embodiment, the supplement further comprises calcium sulfate, gelatin, magnesium stearate, and silica.

In a further embodiment, the system further comprises at least one of following: inert diluents, granulating and disintegrating agents, binding agents, lubricating agents, plasticizers, humectants, electrolytes, buffers, colorants, aromatic agents, flavoring agents, emulsifying agents, compounding agents, formulation agents, permeation enhancers and bulking agents.

In another embodiment, the present invention relates to a dietary supplement comprising at least one thermogenic substance, at least one thyrogenic substance and at least one blood sugar support substance. In still another embodiment, the thermogenic substance being selected from a group consisting of caffeine, catechins, MaHuang, ephedrine, synephrine, norephedrine, psuedoephedrine, and White Willow and extracts thereof and mixtures thereof, the thyrogenic substance being selected from a group consisting of Guggul (guggulsterones), iodine, copper, selenium, thyroid glandular extract, tyrosine and extracts thereof and mixtures thereof; and the blood sugar support substance being selected from a group consisting of Bitter Melon, vanadium, allano lactone, Fenugreek, garcinia, gymnema, marshmallow, chromium, chromium GTF, chromium picolinate, chromium polynicotinate, alpha lipoic acid, inula racemusa, zinc, magnesium, cyclo-hispor, *Agaricus campestris, Medicago sativa*, pinitol and extracts thereof and mixtures thereof.

In yet another embodiment, the supplement further comprising at least one adrenal support substance, the adrenal support substance is selected from a group consisting of Cordyceps, Ashwagandha, Astragalus, ginseng, Schisandra, Siberian ginseng, licorice, Asian ginseng, Codonopsis, Vitamin B complex, pantothenic acid, Vitamin C, adrenal glandular extract, chromium and extracts thereof and mixtures thereof.

In still yet another embodiment, the supplement further comprises at least one anxiolytic substance, the anxiolytic substance is selected from a group consisting of valerian, damiana, chamomile, kava kava, passionflower, hops, skullcap, St. John's wort, hawthorn, lavender, melatonin, 5-Hydroxytrytophan and extracts thereof and mixtures thereof.

In a further embodiment, the present invention relates to a method of manufacturing a dietary supplement with daytime and nighttime components, said method comprising: formulating a daytime component comprising at least one thermogenic substance and a nighttime component comprising at least one adrenal support substance; the thermogenic substance is selected from a group consisting of caffeine, catechins, MaHuang, ephedrine, synephrine, norephedrine, psuedoephedrine, and White Willow and extracts thereof and mixtures thereof; the adrenal support substance is selected from a group consisting of Cordyceps, Ashwagandha, Astragalus, ginseng, Schisandra, Siberian ginseng, licorice, Asian ginseng, Codonopsis, Vitamin B complex, pantothenic acid, Vitamin C, adrenal glandular extract, chromium and extracts thereof and mixtures thereof. In still a further embodiment, the method further comprises utilizing the supplement as a fat burning composition.

In yet a further embodiment, the presently claimed invention relates to a fat burning dietary supplement having daytime and nighttime components, said supplement comprising a daytime component comprising at least one thermogenic substance and a nighttime component comprising at least one anxiolytic substance. In still yet a further embodiment, the thermogenic substance is selected from a group consisting of caffeine, catechins, MaHuang, ephedrine, synephrine, norephedrine, psuedoephedrine, and White Willow and extracts thereof and mixtures thereof. In another embodiment, the anxiolytic substance is selected from a group consisting of valerian, damiana, chamomile, kava kava, passionflower, hops, skullcap, St. John's wort, hawthorn, lavender, melatonin, 5-Hydroxytrytophan and extracts thereof and mixtures thereof. In another embodiment, the daytime component further comprises at least one adrenal support substance. In a further embodiment, the nighttime component comprises at least one adrenal support substance. In still a further embodiment, the adrenal support substance is selected from a group consisting of Cordyceps, Ashwagandha, Astragalus, ginseng, Schisandra, Siberian ginseng, licorice, Asian ginseng, Codonopsis, Vitamin B complex, pantothenic acid, Vitamin C, adrenal glandular extract, chromium and extracts thereof and mixtures thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. Therefore, specific structural and functional details disclosed herein are not to be interpreted as limiting, but merely as a basis for the claims and as a representative basis for teaching one skilled in the art to variously employ the present invention.

The present invention relates to a 24-hour dietary supplement system having a daytime component and a nighttime component and related methods of manufacturing the same. In one embodiment, the daytime component comprises a thermogenic substance and the nighttime component comprises an adrenal support substance. The thermogenic substance of the daytime component of the system of the present invention functions as a fat burner, metabolism booster and/or weight loss aid. The fat burning effects of the thermogenic decreases over time and places stress upon the adrenal glands. The adrenal support substance of the nighttime component functions to support the adrenal glands and maintain effective thermogenic fat burning. In one embodiment, the nighttime components may be consumed after about 4 to about 12 hour intervals of consuming the daytime component.

In another embodiment, the thermogenic substance of the daytime component comprises a guarana seed extract (contains naturally occurring caffeine), Ma haung herb extract, and White Willow bark extract. In one embodiment, White Willow bark functions as a catalyst that enhances the effect of the stimulants or thermogenic substance. In another embodiment, the thermogenic substance of the present invention is tea extract, specifically, green tea extract. Tea is derived from *Camellia sinensis*, a plant native to China. Green tea is the most common beverage in many Asian countries. Green tea has been shown to reduce body fat by promoting fat oxidation, exhibit thermogenic properties, and provide other health benefits, including helping control body composition. The active ingredients in the green tea are caffeine and catechin polyphenols. Studies have shown that the active thermogenic ingredient in the green tea extract is the catechins (epigallocatechins-EGCG).

A thermogenic substance is a substance that increases caloric expenditure. The most commonly used thermogenics are caffeine and Ma Huang. These thermogenic compounds may have stimulatory effects. In one embodiment, the thermogenic substance of the present invention may act as stimulants and the stimulants employed in the supplement of the present invention, is a methylxanthine, or mixtures of methylxanthines. The most widespread stimulant is caffeine, which is primarily ingested by drinking tea or coffee. Caffeine affects the central nervous system, mainly the cerebrum. Caffeine is found in coffee beans, tea, cola nuts, guarana, cacao seeds, and mate. Mate is made from a South American evergreen tree (*Ilex paraguariensis*) whose leaves contain caffeine. Mate is customarily consumed as a tea-like beverage. Guarana is a vine that climbs trees in South America, and grows as a shrub when cultivated in the open. The botanical name is *Paullinia cupana* H.B.K., variety sorbilis. Seeds cultivated from the plant yield guaranine, which has the same chemical composition as caffeine. A syrup extract is obtained from the seeds and used in soft drinks, or the seeds can be roasted and ground into powder. Caffeine may also be manufactured synthetically. The chemical name for caffeine is 1,3,7-trimethylxanthine. Other common methylxanthine stimulants include 1,3-trimethylxanthine (found in tea and commonly called theophylline), and 3,7-dimethylxanthine (found in cacao seeds and tea, and commonly called theobromine). Products containing caffeine are ubiquitous. Ma Huang is an herb that contains ephedra-alkaloids (ephedrine). Ephedra has a thermogenic fat burning effect and increases caloric expenditure. Research has shown that caffeine and ephedra work synergistically to further increase thermogenesis. Thermogenesis is the process by which the increase in body temperature increases caloric expenditure.

In still another embodiment, the adrenal support substance of the nighttime component comprises chromium as chromium picolinate, licorice root extract, Siberian ginseng root extract, Asian ginseng root and astragalus root. Ginseng includes active ingredients such as saponins termed ginsenosides, essential oils, phytosterol, carbohydrates, amino acids, peptides, vitamins, minerals and other ingredients. During stressful situations, the adrenal glands release corticosteroids and adrenaline. When these hormones are depleted, the organism reaches an exhaustive phase. Adrenal support substances, such as ginseng, delay the exhaustive phase and allow a more economical and efficient release of these hormones. Adrenal support substances also reduce stress. In another embodiment, the adrenal support substance includes adaptogens, such as (chick) embryo extract. Adaptogens are substances that help the body respond and adapt to stress by normalizing bodily functions that have been disrupted by various types of stress. Other than the brain, the most important target organ for adaptogens is the adrenal glands. The adrenal glands are a target organ because the glands produce various hormones (adrenaline, noradrenaline, androgens, estrogens, glucocorticoids and mineralcorticoids) and because of their overriding influence on metabolism and other aspects of the physical and mental functions. As stated above, the use of thermogenics have negative effects on the adrenal glands. If the adrenal functions are depleted, the resulting mental irritation, loss of muscle and regression of strength may take a long time to recover and recoup. One of the functions of the adrenal support substance of the nighttime component of the system of the present invention is to normalize adrenal functions and to revitalize the adrenal glands from the stressful effects placed upon the glands from the consumption of the thermogenic substance in the daytime component. If you can normalize adrenal hormone output, virtually all physiological functions improve-from sex and sleep to immune response. For bodybuilding purposes, normalizing adrenal output can increase the potential for fat loss and muscle growth.

In yet another embodiment, the daytime component further comprises a thyrogenic substance and a blood sugar support substance. In still yet another embodiment, the thyrogenic substance comprises a blend of guggulsterones extract of Commiphora mukul resin, bladderwrack kelp, Atlantic kelp, and sargassi seaweed. Guggul is a resin from a tree native to India. This resin has been used in Ayurvedic medicine, which combined it with other plant products to cleanse and rejuvenate the body, especially the blood vessels and joints. It was also used for sore throats and digestive complaints. In Chinese medicine, guggul is known as mo yao and is used to activate blood flow, relieve pain and speed recovery. Guggul is also known to lower cholesterol and increase thyroid functions and the production of thyroid hormones. The active ingredients in guggul include essential oils, myrcene, Z and E guggulsterones, alpha-camphorene, various other guggulsterones, and makulol. The Z and E guggulsterones, extracted with ethyl acetate, are the constituents that appear to be responsible for lowering blood lipids. In another embodiment, the thyrogenic substance may also include selenium as selenomethionine and copper as copper gluconate. The thyrogenic substance also provides weight loss control benefits. Dieting and calorie restrictions slow down human metabolism and the thyroid gland functions to regulate metabolism. The thyrogenic substance supports the thyroid functions and increases the metabolism, thereby increasing the burning of body fat.

In a further embodiment, the blood sugar support substance comprises garcinia cambogia fruit extract, gymnema sylvestre leaf and chromium as chromium picolate.

In still a further embodiment, the nighttime component comprises an anxiolytic substance, in particular, kava kava root. An anxiolytic substance is a relaxant, and the most widespread used relaxant is kava. The anxiolytic substance of the present invention, functions to help improve sleep which is often compromised when dieting or taking supplements to increase metabolism. Kava, which is also known as kava-kava, yaquona, ava, ava-ava, awa, or kawa, is a member of the pepper family Piperceae. Kava is obtained from the rhizome and roots of Piper methysticum Forst. Kava is the most relaxing botanical herb with the exception of the opium poppy. Kava is known to induce general relaxation in humans when orally ingested, but it does not cause drowsiness or involuntary sleep. A liquid macerate of the kava root has been used on islands in the South Pacific in social gatherings and religious rituals for over three thousand years.

Recently, kava has been scientifically scrutinized and its psychoactive ingredients identified. These ingredients are referred to as kavalactones. A total of fifteen kavalactones have been identified to date, including kavain (a.k.a. kawain), dihydrokavain (a.k.a. dihydrokawain), methysticin, dihydromethysticin, yangonin, and demethoxyyangonin. A synthetic version of kava, known as D, L-kavain is also available. The specific kavalactones in kava root extract vary depending upon the origin of the kava plant. Kava roots, and their rhizomes, or distal root tips, are preferred, but other parts of the plant may be used. High quality extracts of kava are sold based upon the total kavalactone content, rather than upon analysis of the individual lactones contained therein.

Studies indicate that kavalactones can relieve nervous anxiety, tension, restlessness, as well as promote muscle relaxation. Studies have also shown that consumption of kavalactones does not irnpair neurophysiological activity, as evidenced by measurements of recognition rates, and driving ability. Further, kavalactones are nonaddictive and do not induce involuntary sleep or symptoms of drunkenness.

Traditionally, kava root is prepared for human consumption by pulverizing the root and/or rhizome and mixing it with water to obtain a liquid which can be consumed orally. Presently, kava root extracts are manufactured using ethanol, as a solvent, as the kavalactones are readily soluble in ethanol. The extracted material is a yellowish brown paste or powder, which is tested to determine the weight percentage of kavalactones. Synthetic versions of kava are also available.

In still a further embodiment, the nighttime component may include one or more of the following: a thyrogenic substance, a cleansing blend and/or a water balancing blend. In another embodiment, the thyrogenic substance of the nighttime component comprises a thyrogenic blend of guggulsterone extracts, Atlantic kelp, bladderwrack kelp, and sargassi seaweed. In still yet a further embodiment, the cleansing blend comprises Senna leaf, rhubarb root, cascara sagrada bark, apple fruit, cassia powder, St. John's bread, tamarind fruit, date fruit and fig fruit. In a further embodiment, the water balancing blend comprises Buchu leaf, cornsilk stylus, couchgrass rhizome, hydrangea root, juniper berry, uva ursi leaf, cranberry fruit extract, dandelion root extract, and artichoke leaf extract.

The supplement of the present invention may be formulated for administration to any suitable human by any conventional route such as oral, rectal, topical or nasal. Any carriers known in the art for oral application may be used. For solid form preparation, such as, for example, powders, tablets, disbursable granules and capsules, a solid carrier may be one or more substances such as diluents, flavoring agents, solubilizers, lubricants, suspending agents, binders, tablets disintegrating agents, encapsulating materials and the like. Suitable carrier materials may include, for example, magnesium carbonate, calcium carbonate, sodium bicarbonate, magnesium stearate, calcium stearate, talc, lactose, sugar, pectin, dextrin, starch, tragacanth, cellulose derivatives, methyl cellulose, sodium carboxymethyl cellulose, a low-melting wax, cocoa butter, alginates, gelatin, polyvinyl pyrrolidone, polyethyl glycols, quaternary ammonium compounds and the like.

Liquid form preparations include solutions, suspensions and emulsions. Suitable carriers may include, for example, water, coloring, flavoring agents, stabilizers and thickening agents. Viscous materials, such as natural synthetic gums, resins, methyl cellulose, sodium carboxymethyl cellulose and other agents known to the pharmaceutical art may also be used.

The composition to be administered may be prepared in accordance with any dose preparation method known in the art, for example mixing, encapsulation, etc., and is not limited. The components of the composition may be added in any order without limitation.

For rectal applications, suitable formulations for compositions according to the present invention include suppositories (emulsion or suspension type), and rectal gelatin capsules (solution or suspensions). In a typical suppository formulation, the active ingredients are combined with an appropriate pharmaceutically acceptable suppository base such as cocoa butter, esterified acids, glycerinated gelatin, and various water soluble or dispersable bases like polyethylene glycols and polyoxyethylene glycols and polyoxyethylene sorbitan fatty acid esters.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A dietary supplement comprising at least one thermogenic substance, at least one adrenal support substance and at least one thyrogenic substance, wherein said thermogenic substance is selected from a group consisting of caffeine, catechins, MaHuang, ephedrine, synephrine, norephedrine, psuedoephedrine, and White Willow and extracts thereof and mixtures thereof, wherein said adrenal support substance is selected from a group consisting of Cordyceps, Ashwagandha, Astragalus, ginseng, Schisandra, Siberian ginseng, licorice, Asian ginseng, Codonopsis, adrenal glandular extract, embryo extract, and extracts thereof and mixtures thereof, and said thyrogenic substance is selected from a group consisting of guggelsterones, thyroid glandular extract, tyrosine and extracts thereof and mixtures thereof.

2. A dietary supplement comprising at least one thermogenic substance, at least one adrenal support substance and at least one blood sugar regulation substance, wherein said thermogenic substance is selected from a group consisting of caffeine, catechins, MaHuang, ephedrine, synephrine, norephedrine, psuedoephedrine, and White Willow and extracts thereof and mixtures thereof, wherein said adrenal support substance is selected from a group consisting of Cordyceps, Ashwagandha, Astragalus, ginseng, Schisandra, Siberian ginseng, licorice, Asian ginseng, Codonopsis, adrenal glandular extract, embryo extract, and extracts thereof and mixtures thereof, and wherein said blood sugar regulation substance is selected from a group consisting of Bitter Melon, vanadium, allano lactone, Fenugreek, garcinia, gymnema, marshmallow, alpha lipoic acid, inula racemusa, cyclo-hispor, *Agaricus campestris, Medicago sativa*, pinitol and extracts thereof and mixtures thereof.

3. A dietary supplement system comprising a daytime component and a nighttime component, said daytime component comprising at least one thermogenic substance and at least one thyrogenic substance, and said nighttime component comprising at least one adrenal support substance, said thermogenic substance of said daytime component is selected from a group consisting of caffeine, catechins, MaHuang, ephedrine, synephrine, norephedrine, psuedoephedrine, and White Willow and extracts thereof and mixtures thereof, said thyrogenic substance of said daytime component is selected from a group consisting of guggulsterones, thyroid glandular extract, tyrosine and extracts thereof and mixtures thereof, and said adrenal support substance of said nighttime component is selected from a group consisting of Cordyceps, Ashwagandha, Astragalus, ginseng, Schisandra, Siberian ginseng, licorice, Asian ginseng, Codonopsis, adrenal glandular extract, embryo extract and extracts thereof and mixtures thereof.

4. A dietary supplement system comprising a daytime component and a nighttime component, wherein said daytime component comprising at least one thermogenic substance and at least one blood sugar support substance, and said nighttime component comprising at least one adrenal support substance, said thermogenic substance of said daytime component is selected from a group consisting of caffeine, catechins, MaHuang, ephedrine, synephrine, norephedrine, psuedoephedrine, and White Willow and extracts thereof and mixtures thereof, said blood sugar support substance of said daytime component being selected from a group consisting of Bitter Melon, vanadium, allano lactone, Fenugreek, garcinia, gymnema, marshmallow, alpha lipoic acid, inula racemusa, cyclo-hispor, *Agaricus campestris, Medicago sativa*, pinitol and extracts thereof and mixtures thereof, and said adrenal support substance of said nighttime component is selected from a group consisting of Cordyceps, Ashwagandha, Astragalus, ginseng, Schisandra, Siberian ginseng, licorice, Asian ginseng, Codonopsis, adrenal glandular extract, embryo extract and extracts thereof and mixtures thereof.

5. A dietary supplement system comprising a daytime component and a nighttime component, said daytime component comprising at least one thermogenic substance, and said nighttime component comprising at least one adrenal support substance and at least one thyrogenic substance, said thermogenic substance of said daytime component is selected from a group consisting of caffeine, catechins, MaHuang, ephedrine, synephrine, norephedrine, psuedoephedrine, and White Willow and extracts thereof and mixtures thereof, said adrenal support substance of said nighttime component is selected from a group consisting of Cordyceps, Ashwagandha, Astragalus, ginseng, Schisandra, Siberian ginseng, licorice, Asian ginseng, Codonopsis, adrenal glandular extract, embryo extract and extracts thereof and mixtures thereof, and said thyrogenic substance of said nighttime component is selected from a group consisting of guggulsterones, thyroid glandular extract, tyrosine and extracts thereof and mixtures thereof.

6. A dietary supplement comprising at least one thermogenic substance, at least one thyrogenic substance and at least one blood sugar support substance, wherein said thermogenic substance being selected from a group consisting of caffeine, catechins, MaHuang, ephedrine, synephrine, norephedrine, psuedoephedrine, and White Willow and extracts thereof and mixtures thereof, said thyrogenic substance being selected from a group consisting of guggulsterones, thyroid glandular extract, tyrosine and extracts thereof and mixtures thereof, and said blood sugar support substance being selected from a group consisting of Bitter Melon, vanadium, allano lactone, Fenugreek, garcinia, gymnema, marshmallow, alpha lipoic acid, inula racemusa, cyclo-hispor, *Agaricus campestris, Medicago sativa*, pinitol and extracts thereof and mixtures thereof.

* * * * *